Nov. 15, 1949  G. H. VIGNERON  2,488,043
CASTER AND CAMBER GAUGE
Filed July 10, 1944  2 Sheets-Sheet 1
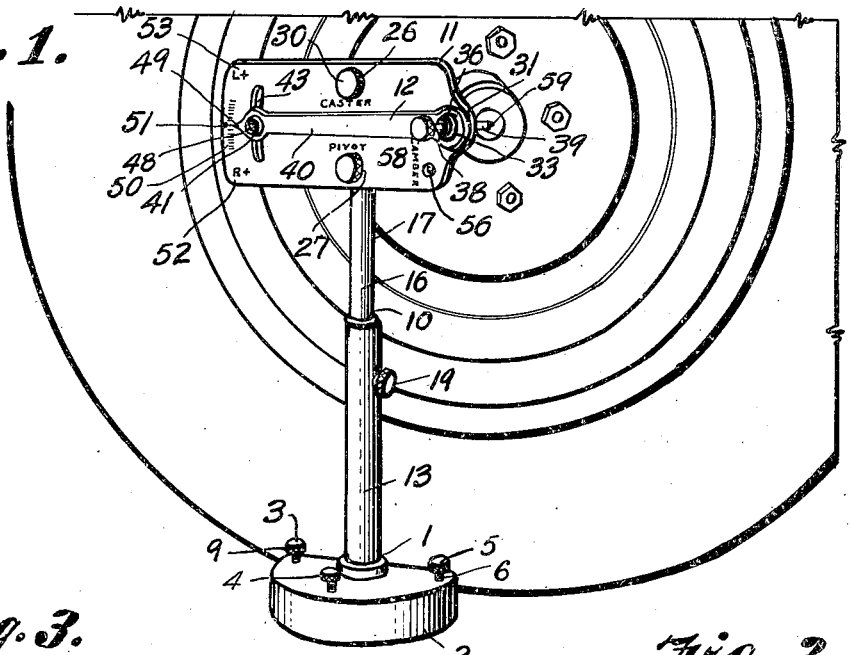
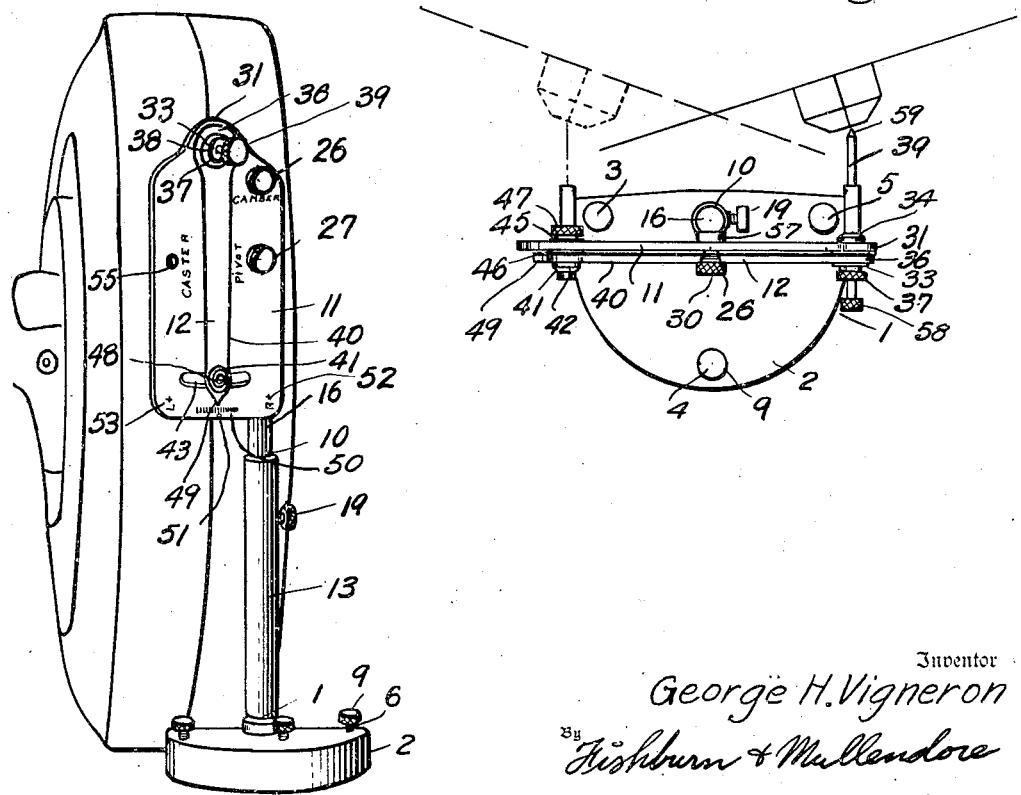
Inventor
George H. Vigneron
By Fishburn & Mullendore
Attorneys

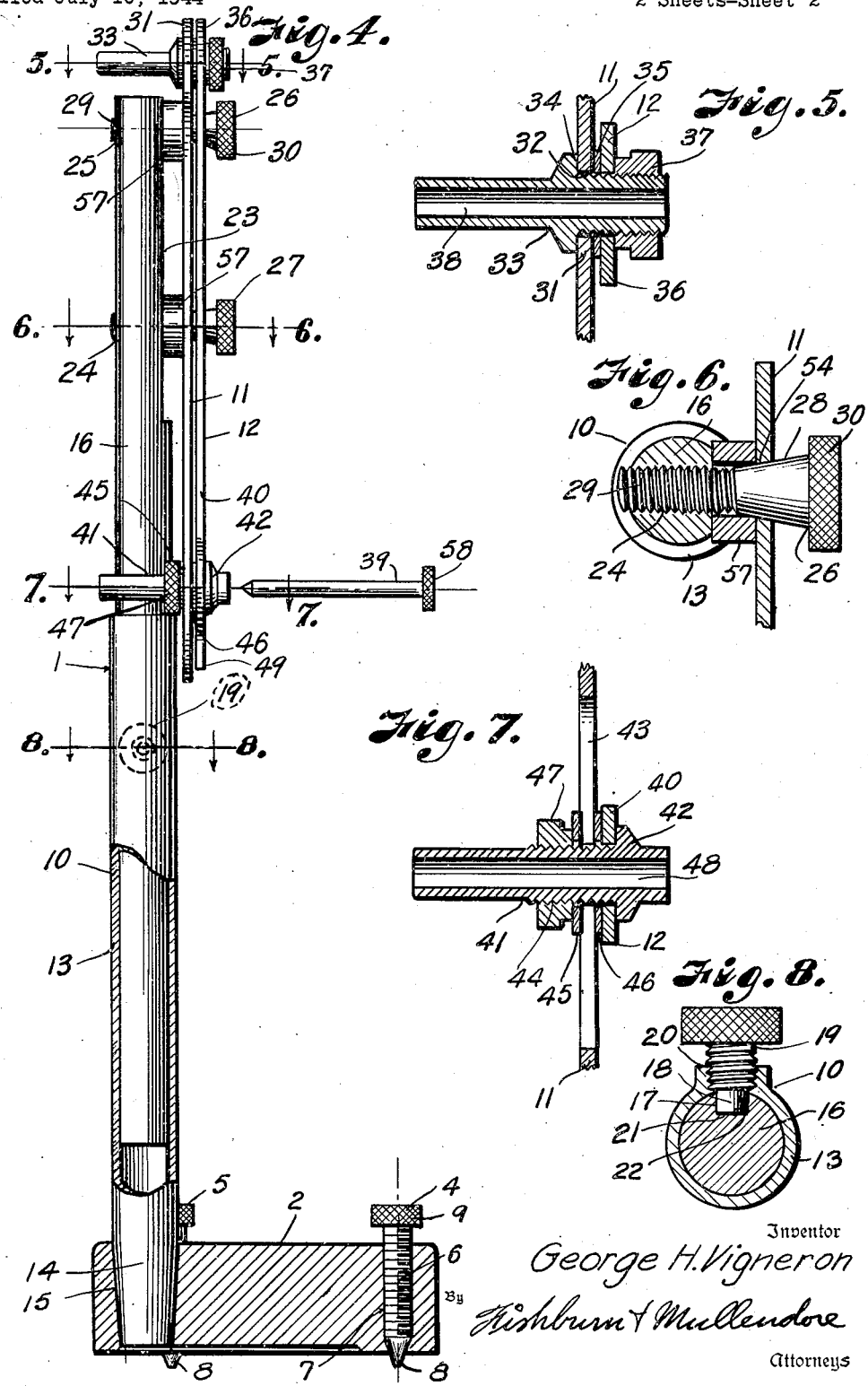

Patented Nov. 15, 1949

2,488,043

UNITED STATES PATENT OFFICE 2,488,043

CASTER AND CAMBER GAUGE

George H. Vigneron, Topeka, Kans.

Application July 10, 1944, Serial No. 544,280

6 Claims. (Cl. 33—203.15)

This invention relates to a gauge for testing camber and caster of the steerable wheels of a motor vehicle and has for its principal objects to provide a simple and relatively inexpensive gauge construction; to provide a gauge which may be easily assembled or disassembled without tools and readily manipulated for accurately determining camber and caster of a wheel; to provide a gauge that indicates caster and camber in degrees; to provide a gauge construction that is readily changed from caster setting to camber setting; to provide a gauge structure adapted for use in a minimum space so that it may be used on vehicles having small clearance between the wheels and fenders; and to provide a gauge that is readily adjusted to wheels of various diameters.

In accomplishing these and other objects of the invention hereinafter pointed out, I have provided improved details of structure, the preferred form of which is illustrated in the accompanying drawings wherein:

Fig. 1 is a perspective view of a gauge constructed in accordance with the present invention and illustrating use thereof for determining caster of a motor vehicle wheel.

Fig. 2 is a plan view of the gauge.

Fig. 3 is a perspective view of the gauge illustrating use thereof in determining camber of a wheel.

Fig. 4 is an enlarged side elevational view of the gauge, parts of which are shown in section to better illustrate the construction thereof.

Fig. 5 is a horizontal section through the gauge on the line 5—5 of Fig. 4.

Fig. 6 is a similar section on the line 6—6 of Fig. 4 particularly illustrating mounting of the dial plate.

Fig. 7 is a horizontal section on the line 7—7 of Fig. 4.

Fig. 8 is a horizontal section through the post of the gauge particularly illustrating the clamping screw for supporting the telescoping parts of the gauge in adjusted position.

Referring more in detail to the drawings:

1 designates a gauge constructed in accordance with the present invention and which includes a substantially heavy base 2 of somewhat semi-circular shape to accommodate leveling screws 3, 4, and 5 spaced approximately 90 degrees apart to provide a substantially tripointed support for the base 2. The adjusting screws include threaded shanks 6 engaged in threaded bores 7 of the base and having pointed ends 8 adapted to engage with the floor or other support on which the gauge is to be used. The adjusting screws have knurled heads 9 by which they may be turned to adjust the projection of the points 8 when leveling the base to obtain perpendicular position of a post 10 carrying the dial 11 and pointer element 12 of the gauge later described. The post 10 includes a tubular lower section 13 having a swedged or tapered lower end 14 wedgedly engaged in a tapered bore 15 formed in the base 2 intermediate the position of the adjusting screws 3 and 5 and substantially in the axis of the base as best shown in Figs. 2 and 4.

Adjustably supported within the tubular section is a preferably solid, rod-like section 16 having a longitudinal groove 17 in a side thereof to accommodate a reduced terminal 18 of a clamping screw 19 that is engaged in an internally threaded boss 20 projecting from the side of the tubular section near the upper end thereof whereby the end face 21 of the reduced terminal 18 may be threaded into and out of engagement with the bottom face 22 of the groove 17 while the terminal remains in the groove to prevent turning of the rod-like section when it is adjusted relative to the tubular section for the purpose later described. The upper end of the rod-like section has a flat face 23 on the side thereof and extending therethrough are transverse bores 24 and 25 which are spaced apart and internally threaded to accommodate dial-attaching screws 26 and 27. The screws 26 and 27 are of like construction and include tapered shank portions 28 having threaded terminals 29 engaging in the threaded openings 24 and 25. The screws 26 and 27 also have knurled heads 30 at the base of the tapered portions 28 by which the threaded shanks are turned into the threaded openings.

The dial plate 11 is of substantially rectangular formation and has a curved extension or bearing portion 31 extending from one of the end edges thereof for accommodating an opening 32 for mounting a tubular member 33. The member 33 has a collar 34 spaced inwardly from the ends thereof. One end at one side of the collar has external threads and is projected through the opening 32 so that the collar seats against the dial plate as shown in Fig. 5. Sleeved on the threaded portion is a spacing washer 35, a hub 36 of the pointer 12, and a nut 37, which nut cooperates with the collar 34 in retaining the pointer so that it is adapted to pivot about the axis of the member 33. The member 33 has an axial bore 38 for passing a stylus pin 39 later described. The pointer 12 has an arm portion 40 extending over the face of the scale and carries a tubular member 41 similar to the member 33 previously described. The member 41 has the collar 42 thereof located near one end so as to engage the outer face of the pointer when the opposite end is projected through an arcuate slot 43 formed in the plate as best shown in Fig. 1. The portion of the member 41 which projects through the slot is externally threaded as at 44 and mounts spacing washers 45 and 46 engaging the respective sides of the dial plate and which are retained in position by a knurled nut 47 also mounted on the threaded portion of the member 41. The member 41 has a cylindrical bore 48 similar to the bore 38 in the other member to accommodate the stylus pin which is projected therethrough in taking the camber and caster of a wheel as later described.

The arm of the pointer terminates in a point 49 that is movable over the scale 50 having graduations representing degrees from the right to the left of a zero point 51, which point is in alignment with a plane extending through the median line of the dial plate. The graduations on one side are marked with "R+" and on the other side with "L+" as indicated at 52 and 53, Figs. 1 and 3. Thus, the dial is graduated in degrees to each side of the zero or center line of the dial. The graduation is marked "R+" designating the right side positive, while the other side is marked "L+" designating the left side positive.

The dial plate carrying the pointer is mounted on the post in two positions, one for obtaining the caster and one when determining the camber of a wheel. The dial plate is, therefore, provided with openings 54 and 55 located near the longer edges of the plate midway between the axes of the members 33 and 41, and an opening 56 that is located near one corner of the dial plate in a plane extending through the opening 54 parallel with the plane passing through the axis of the member 33 and the zero point of the scale. The openings 54 and 55 are preferably marked with "Pivot" and "Caster" respectively while the opening 56 is marked "Camber."

The dial plate is spaced from the flat face of the post section 16 by spacers 57 as shown in Figs. 4 and 6. The stylus pins may be furnished in different lengths so as to conform to the conditions encountered when taking measurements of wheels of the different makes of vehicles. The pins are preferably provided with heads 58 to facilitate placement and withdrawal thereof in the respective bores 38 and 48 of the members 33 and 41, and the opposite ends of the pins have points 59.

When the device is used for determining the caster of a wheel the vehicle is placed preferably on a level floor so that the device stands level with the post thereof in a perpendicular position; however, if this is not the case, the base 2 is readily brought to a level by placing a spirit level thereon and adjusting the screws 3, 4, and 5 until the base is level at which time the post is in perpendicular position. The base is then shifted so that the post registers with the axis of the wheel to be gauged and with the wheel in a straight fore and aft position, the dial plate 11 is adjusted on the post so that the clamping screw 27 passes through the opening 54 marked "Pivot" and the other clamping screw 26 passes through the opening 55 marked "Caster" (see Fig. 1). The clamping screws are tightened by turning the heads 30 thereof to draw the tapered portions 28 into the respective openings of the dial plate 11, the dial plate preferably being spaced from the flat face of the post by the spacers as best shown in Fig. 6. When the screws are drawn tight the dial plate is rigidly supported on the post and free of any motion. The rod section 16 of the post is then adjusted by loosening the set screw 19 and sliding the rod section in the tubular section 13 until the axis of the bore 38 is in line with the axis of the wheel. The wheel is then turned by manipulating the steering wheel of the vehicle so that the wheel turns to the left, preferably to its limit. A center punch is then used to mark off the center of the hub cap, after which a stylus pin 39 of convenient length is passed through the bore 38 and the point registered with the punch mark in the hub cap. If absolute registry is not obtained, this may be effected by raising or lowering the rod-like section of the post. The wheel is then turned to the right a corresponding distance as indicated by the dotted lines, Fig. 2. The stylus pin is then withdrawn and inserted through the bore 48 at the opposite end of the pointer, after which the pointer is shifted up or down to register the point of the stylus with the punch mark in the cap. If the caster angle of the wheel is zero, the point 49 of the indicator arm 40 will register with the zero mark 51. If it is necessary to shift the pointer toward the section of the scale indicated by "R+," the caster for that wheel is indicated in degrees by noting the position of the pointer relative to that section of the scale. The caster of the other wheel is obtained in a similar manner, however, in this instance the caster is obtained by noting the position of the point of the pointer relative to the scale indicated "L+."

In using the device to determine the camber of a wheel, the clamping screw 27 in the opening 24 is loosened and the clamping screw 26 is completely removed, after which the dial plate is pivoted on the loosened clamping screw to a perpendicular position as shown in Fig. 3. The removed screw 26 is then replaced by passing it through the opening 56 and screwing it up until the taper thereof firmly urges the dial plate against the spacing washer, after which the other clamping screw is tightened to rigidly support the dial plate against movement as shown in Fig. 3.

The wheel is then raised from the ground so that it will revolve freely to permit striping a mark circumferentially of the tread by holding a piece of chalk or the like thereagainst while the wheel is turned. The device is then positioned in front of the wheel so that a stylus pin 39 passed through the bore 38 registers with the chalk line on the wheel after which the stylus pin is removed and passed through the bore 48 at the indicator end of the indicator arm 40, after which the pointer is shifted to the right or left until the point of the stylus registers with the chalk line on the wheel. The amount of movement of the pointer to bring the point of the stylus into registry with the line of the wheel indicates the amount of camber which may be read on the scale by noting the position of the point 49 relative to the graduations.

It will be noted that when checking the caster or camber angles on the right side of a vehicle, the readings recorded on the R+ side of the scale are positive degrees, while readings on the opposite side of the scale are negative. When checking the caster or camber angles on the left side of the vehicle, the readings recorded on the L+ side of the scale are positive, while the readings recorded on the opposite side of the scale are negative. This method simplifies the distinction between positive and negative or + and — readings and lessens chances for error, especially by one not well versed in wheel alignment work.

From the foregoing it is obvious that I have provided a gauge for testing the camber and caster of a wheel which is of simple and inexpensive construction and which is easily operated to obtain accurate measurements as to the camber and caster characteristics of a wheel.

What I claim and desire to secure by Letters Patent is:

1. A device of the character described including, a base, an upright support on the base, a dial member having a scale, a pointer, a hollow spindle member for pivotally mounting the pointer on the dial member to move over the scale on the respective sides of a plane passing through a central division in the scale and through the axis of the spindle, a hollow member carried by the pointer and guided in a slot of the dial member, a stylus adapted to be projected selectively through said hollow members, means pivotally mounting the dial member on the support at a point on the dial member offset laterally from said plane, and fastening means adapted to position the dial member on the support with the pointer extending substantially horizontal for indicating deviations of the point of the stylus when inserted in said hollow guided member from the point of the stylus when inserted in the hollow spindle member and with the pointer substantially vertical for indicating deviations from a vertical plane passing through the axis of said hollow spindle.

2. A wheel testing device of the character described including, a base, an upright support on the base, a dial member having a scale, a pointer, a hollow spindle for pivotally mounting the pointer on the dial member to move over the scale on the respective sides of a plane passing through a central division in the scale and through the axis of the spindle, a hollow member carried by the pointer and guided in a slot of the dial member, a stylus adapted to be projected selectively through said hollow members, means pivotally mounting the dial member on the support at a point on the dial member offset laterally from said plane, and fastening means adapted to position the dial member on the support with the pointer extending substantially horizontal for indicating deviations of the point of the stylus when inserted in said hollow guided member from the point of the stylus when inserted in the hollow spindle member and with the pointer substantially vertical for indicating deviations from a vertical plane passing through the axis of said hollow spindle, said upright support being adjustable vertically relatively to the base to position the point of the stylus when carried by the hollow spindle member in registry with the axis of a wheel.

3. A device of the character described including a base, an adjustable upright support on the base having an internally threaded opening therethrough, a dial member having a scale, a pointer, means pivotally mounting the pointer on the dial member to move over the scale on the respective sides of a plane passing through a central division in the scale and the axis of the pivotal mounting, means pivotally mounting the dial member on the adjustable support at a point spaced from the internally threaded opening and at a point on the dial member offset laterally from said plane, said dial member having an opening spaced from the pivotal mounting in a direction at right angles to said plane and an opening spaced from said pivotal mounting of the dial member in a direction parallel to said plane, said dial openings being adapted to be alternately registered with the internally threaded opening in the support, and a fastening device adapted to be projected through one opening of the dial member and into said internally threaded opening of the upright support to position the dial member with the pointer extending substantially horizontally for indicating deviations from a plane passing through the pivotal mounting of the pointer and through the other opening of the dial member and into said internally threaded opening to position the dial member with the pointer substantially vertical for indicating deviations from a vertical plane passing through the axis of the pivotal mounting of the pointer.

4. A device of the character described including a base, an adjustable upright support on the base having an internally threaded opening therein, a dial member having a scale, a pointer, means pivotally mounting the pointer on the dial member to move over the scale on the respective sides of a plane passing through a central division in the scale and the axis of the pivotal mounting, means pivotally mounting the dial member on the adjustable support at a point spaced from the internally threaded opening and at a point on the dial member offset laterally from said plane, said dial member having an opening spaced from the pivotal mounting in a direction at right angles to said plane and an opening spaced from said pivotal mounting of the dial member in a direction parallel to said plane, said dial openings being adapted to be alternately registered with the internally threaded opening in the support, and a fastening device adapted to be projected through one opening of the dial member and into said internally threaded opening of the upright support to position the dial member with the pointer extending substantially horizontally for indicating deviations from said plane passing through the pivotal mounting of the pointer and through the other opening of the dial member and into said internally threaded opening to position the dial member with the pointer substantially vertical for indicating deviations from a vertical plane passing through the axis of the pivotal mounting of the pointer, said fastening device having a tapered portion adapted to engage said openings in the dial member.

5. A device of the character described including a base, an adjustable upright support on the base having vertically spaced openings therein, a dial member having a scale, a pointer, means pivotally mounting the pointer on the dial member to move over the scale on the respective sides of a plane passing through a central division in the scale and the axis of the pivotal mounting of the pointer, said dial member having openings spaced on opposite sides of said plane, a fastening device extending through one of the openings in the dial member into the lower opening of the upright for pivotally mounting the dial member, said dial member also having an opening spaced from the opening through which the fastening device extends a distance equal to the spacing of the vertically spaced openings in the support and in alignment with said opening which passes said fastening device in a direction parallel to said plane, and a fastening device adapted to be projected through said aligned opening of the dial member and into the upper opening of the upright support to retain the dial member in one position with the pointer indicating deviations from a vertical plane passing through the pivotal mounting of the pointer and through the unused opening of the dial member when the dial member is moved to another position with the pointer indicating deviations from a horizontal plane passing through the axis of pivotal mounting of the pointer, said fastening devices having a tapered portion adapted to engage said openings in the dial member.

6. A wheel testing device of the character described including, a base, an adjustable upright support on the base having an internally threaded opening therein, a dial member having a scale, a pointer, a hollow spindle pivotally mounting the pointer on the dial member to move over the scale on the respective sides of a plane passing through a central division in the scale and the axis of the hollow spindle, a hollow guide member carried by the pointer and projecting through a slot in the dial member, means pivotally mounting the dial member on the adjustable support at a point spaced from the internally threaded opening and at a point on the dial member offset laterally from said plane, said dial member having an opening spaced from the pivotal mounting in a direction at right angles to said plane and an opening spaced from said pivotal mounting of the dial member in a direction parallel to said plane, said dial openings being adapted to be alternately registered with the internally threaded opening in the support, a fastening device adapted to be projected through one opening of the dial member and into said internally threaded opening of the upright support to position the dial member with the pointer extending substantially horizontally for indicating deviations from said plane passing through the pivotal mounting of the pointer and through the other opening of the dial member and into said internally threaded opening to position the dial member with the pointer substantially vertical for indicating deviations from a plane passing through the axis of the pivotal mounting of the pointer, and a stylus projected through the hollow spindle and the hollow member on said dial member to facilitate positioning of the pointer with respect to points on a wheel.

GEORGE H. VIGNERON.

REFERENCES CITED

The following references are of record in the file of this patent:

UNITED STATES PATENTS

| Number | Name | Date |
|---|---|---|
| 1,641,243 | Wochner | Sept. 6, 1927 |
| 1,992,521 | Creagmile | Feb. 26, 1935 |
| 2,029,067 | Graham et al. | Jan. 28, 1936 |